United States Patent
Kramarov et al.

(10) Patent No.: US 10,891,586 B1
(45) Date of Patent: Jan. 12, 2021

(54) SYSTEMS AND METHODS OF DETECTING, IDENTIFYING AND CLASSIFYING OBJECTS POSITIONED ON A SURFACE

(71) Applicant: Smart Supervision Systems LLC, Samara (RU)

(72) Inventors: Anton Kramarov, Samara (RU); Yevgeni Tsirulnik, Frisco, TX (US)

(73) Assignee: Smart Supervision System LLC, Samara (RU)

( * ) Notice: Subject to any disclaimer, the term of this patent is extended or adjusted under 35 U.S.C. 154(b) by 0 days.

(21) Appl. No.: 16/679,734

(22) Filed: Nov. 11, 2019

Related U.S. Application Data

(60) Provisional application No. 62/770,836, filed on Nov. 23, 2018.

(51) Int. Cl.
 *G05B 19/00* (2006.01)
 *G06Q 10/08* (2012.01)
 *G01G 19/413* (2006.01)
 *G06F 3/041* (2006.01)

(52) U.S. Cl.
 CPC ......... *G06Q 10/087* (2013.01); *G01G 19/413* (2013.01); *G06F 3/0416* (2013.01)

(58) Field of Classification Search
 CPC .. G06Q 10/087; G01G 19/413; G06F 3/0416; G08B 29/14; G08B 21/182; G01R 33/07; G01R 33/09
 See application file for complete search history.

(56) References Cited

U.S. PATENT DOCUMENTS

| | | | |
|---|---|---|---|
| 4,819,015 A | 4/1989 | Bullivant et al. | |
| 5,844,488 A * | 12/1998 | Musick | G08B 21/22 340/573.4 |
| 7,168,618 B2 | 1/2007 | Schwartz | |
| 7,319,479 B1 | 1/2008 | Crabtree et al. | |
| 7,427,023 B2 | 9/2008 | Suenbuel | |
| 7,673,464 B2 | 3/2010 | Bodin et al. | |
| 7,780,081 B1 | 8/2010 | Liang | |
| 7,844,509 B2 | 11/2010 | Bodin et al. | |
| 7,909,207 B2 | 3/2011 | Handfield et al. | |
| 7,961,104 B2 | 6/2011 | Bodin et al. | |
| 8,275,665 B2 | 9/2012 | Bodin et al. | |
| 8,321,330 B2 | 11/2012 | Kerschner et al. | |
| 8,473,374 B2 | 6/2013 | Allison et al. | |

(Continued)

*Primary Examiner* — Munear T Akki
(74) *Attorney, Agent, or Firm* — Smith, Anderson, Blount, Dorsett, Mitchell & Jernigan, LLP

(57) ABSTRACT

Systems and methods of detecting, identifying, and classifying objects positioned on a shelf are provided. In one exemplary embodiment, a sensor pad comprises a plurality of electrical contacts disposed in the pad as a matrix of rows and columns of electrical contacts. Further, each contact corresponds to a different surface area of the pad and has a first electrical conductor positioned on a first layer and a second electrical conductor positioned opposite to the first conductor on a second layer. Also, at least one of the first and second conductors is operable to vary in resistance or capacitance based on an amount of pressure applied to that conductor. In addition, each contact is configured to enable an electrical connection between the first and second conductors with a resistance or capacitance that varies based on an amount of pressure applied to a corresponding area of the pad when an object is positioned on that pad.

17 Claims, 9 Drawing Sheets

(56) References Cited

U.S. PATENT DOCUMENTS

| | | |
|---|---|---|
| 8,751,318 B2 | 6/2014 | Kim et al. |
| 9,240,090 B2 | 1/2016 | Vogler et al. |
| 9,275,361 B2 * | 3/2016 | Meyer ................ G01G 19/4144 |
| 9,473,747 B2 | 10/2016 | Kobres et al. |
| 9,516,280 B1 | 12/2016 | Renkis |
| 9,600,076 B2 | 3/2017 | Levesque et al. |
| 9,727,838 B2 | 8/2017 | Campbell |
| 9,875,481 B2 | 1/2018 | Pradhan et al. |
| 9,928,695 B2 | 3/2018 | Hamada |
| 9,984,355 B2 | 5/2018 | Jones et al. |
| 10,001,402 B1 | 6/2018 | Gyori et al. |
| 10,007,892 B1 | 6/2018 | Hahn et al. |
| 10,062,100 B2 | 8/2018 | Alvarez et al. |
| 10,064,502 B1 | 9/2018 | Gyori et al. |
| 10,121,121 B1 | 11/2018 | De Bonet et al. |
| 10,121,164 B2 | 11/2018 | Aoki et al. |
| 10,129,507 B2 | 11/2018 | Landers et al. |
| 10,130,195 B2 | 11/2018 | Phillips et al. |
| 10,140,820 B1 | 11/2018 | Zalewski et al. |
| 10,163,149 B1 | 12/2018 | Famularo et al. |
| 10,192,087 B2 | 1/2019 | Davis et al. |
| 10,198,710 B1 | 2/2019 | Hahn et al. |
| 10,244,363 B1 | 3/2019 | Niranjayan et al. |
| 10,251,144 B2 | 4/2019 | Blaser et al. |
| 10,262,293 B1 | 4/2019 | Prater et al. |
| 10,262,294 B1 | 4/2019 | Hahn et al. |
| 10,282,852 B1 | 5/2019 | Buibas et al. |
| 10,318,917 B1 | 6/2019 | Goldstein et al. |
| 10,318,919 B2 | 6/2019 | Bermudez Rodriguez et al. |
| 10,332,066 B1 | 6/2019 | Palaniappan et al. |
| 2002/0027348 A1 * | 3/2002 | Speckhart ................ B60N 2/002 280/735 |
| 2003/0018897 A1 | 1/2003 | Bellis et al. |
| 2003/0160621 A1 * | 8/2003 | Cresswell ........... G01G 19/4142 324/691 |
| 2003/0233320 A1 | 12/2003 | Connor |
| 2004/0073334 A1 | 4/2004 | Terranova |
| 2005/0043857 A1 | 2/2005 | Van Fleet |
| 2005/0171854 A1 | 8/2005 | Lyon |
| 2005/0190072 A1 | 9/2005 | Brown et al. |
| 2006/0149640 A1 | 7/2006 | Gordon et al. |
| 2006/0178947 A1 | 8/2006 | Zsigmond et al. |
| 2006/0238307 A1 | 10/2006 | Bauer et al. |
| 2008/0052201 A1 | 2/2008 | Bodin et al. |
| 2008/0189170 A1 | 8/2008 | Ramachandra |
| 2011/0096017 A1 * | 4/2011 | Li ....................... G02F 1/13338 345/174 |
| 2013/0284806 A1 | 10/2013 | Margalit |
| 2013/0290112 A1 | 10/2013 | Davis et al. |
| 2014/0043162 A1 | 2/2014 | Siciliano et al. |
| 2014/0214547 A1 | 7/2014 | Signorelli et al. |
| 2015/0344060 A1 * | 12/2015 | Staszak ............... H03K 17/9622 324/697 |
| 2016/0019514 A1 | 1/2016 | Landers et al. |
| 2016/0026032 A1 * | 1/2016 | Moore ................. G02F 1/13452 382/103 |
| 2016/0063821 A1 | 3/2016 | MacIntosh et al. |
| 2016/0104175 A1 | 4/2016 | Fanourgiakis et al. |
| 2016/0110700 A1 | 4/2016 | Brosnan et al. |
| 2016/0203699 A1 | 7/2016 | Mulhern et al. |
| 2016/0253735 A1 | 9/2016 | Scudillo et al. |
| 2017/0003792 A1 * | 1/2017 | Berget ..................... G06F 3/044 |
| 2017/0032649 A1 * | 2/2017 | Hou ................... G08B 21/0453 |
| 2017/0124603 A1 | 5/2017 | Olson |
| 2017/0148005 A1 | 5/2017 | Murn |
| 2017/0169440 A1 | 6/2017 | Dey et al. |
| 2017/0316372 A1 | 11/2017 | Thompson et al. |
| 2017/0323359 A1 | 11/2017 | Dey et al. |
| 2017/0344935 A1 | 11/2017 | Mattingly et al. |
| 2018/0046975 A1 | 2/2018 | Jones et al. |
| 2018/0078992 A1 | 3/2018 | High et al. |
| 2018/0082245 A1 | 3/2018 | Jones et al. |
| 2018/0096566 A1 | 4/2018 | Blair et al. |
| 2018/0107970 A1 | 4/2018 | Jones et al. |
| 2018/0114184 A1 | 4/2018 | Brooks et al. |
| 2018/0137523 A1 | 5/2018 | Kim et al. |
| 2018/0144292 A1 | 5/2018 | Mattingly et al. |
| 2018/0165626 A1 | 6/2018 | Davidson et al. |
| 2018/0165711 A1 | 6/2018 | Montemayor et al. |
| 2018/0165728 A1 | 6/2018 | McDonald et al. |
| 2018/0174096 A1 | 6/2018 | Daily et al. |
| 2018/0181908 A1 | 6/2018 | Jones et al. |
| 2018/0189722 A1 | 7/2018 | Aepli |
| 2018/0197130 A1 | 7/2018 | Brooks et al. |
| 2018/0204163 A1 | 7/2018 | Bender et al. |
| 2018/0211208 A1 | 7/2018 | Winkle et al. |
| 2018/0215544 A1 | 8/2018 | High et al. |
| 2018/0218185 A1 | 8/2018 | High et al. |
| 2018/0218317 A1 * | 8/2018 | Ryan ................... G06Q 10/087 |
| 2018/0231973 A1 | 8/2018 | Mattingly et al. |
| 2018/0232796 A1 | 8/2018 | Glaser et al. |
| 2018/0242126 A1 | 8/2018 | Shah et al. |
| 2018/0247264 A1 | 8/2018 | Taylor et al. |
| 2018/0247361 A1 | 8/2018 | Tsuboi et al. |
| 2018/0285902 A1 | 10/2018 | Nazarian et al. |
| 2018/0293537 A1 | 10/2018 | Kwok |
| 2018/0306958 A1 | 10/2018 | Goss et al. |
| 2018/0365642 A1 | 12/2018 | Bonner et al. |
| 2018/0365668 A1 | 12/2018 | Hay |
| 2019/0036527 A1 * | 1/2019 | Dolcetti ................ B60N 2/002 |
| 2019/0043057 A1 | 2/2019 | Montgomery |
| 2019/0073627 A1 | 3/2019 | Nakdimon et al. |
| 2019/0078930 A1 | 3/2019 | Ravulapati |
| 2019/0088096 A1 | 3/2019 | King et al. |
| 2019/0095856 A1 | 3/2019 | Jones et al. |
| 2019/0102837 A1 | 4/2019 | Smith et al. |
| 2019/0108396 A1 | 4/2019 | Dal Mutto et al. |
| 2019/0114488 A1 | 4/2019 | Glazer et al. |
| 2019/0117124 A1 * | 4/2019 | Hsu ....................... A61B 5/6807 |
| 2019/0122292 A1 | 4/2019 | Riggins et al. |
| 2019/0149725 A1 | 5/2019 | Adato et al. |
| 2019/0156270 A1 | 5/2019 | Karmakar |
| 2019/0156394 A1 | 5/2019 | Karmakar |
| 2019/0164098 A1 | 5/2019 | Setchell et al. |
| 2019/0172039 A1 | 6/2019 | Kambara et al. |
| 2019/0180581 A1 | 6/2019 | Marszalek et al. |
| 2019/0188435 A1 | 6/2019 | Davis et al. |
| 2019/0188782 A1 | 6/2019 | Howard et al. |
| 2019/0204897 A1 * | 7/2019 | Duron ..................... H02S 20/20 |

* cited by examiner

700

701 — DURING A SCAN OF A MATRIX OF CONTACTS HAVING ROWS AND COLUMNS OF CONTACTS, RECEIVE, BY A PROCESSOR, FROM EACH ROW AND COLUMN OF CONTACTS, AN INDICATION OF A RESISTANCE OR CAPACITANCE OF THAT ROW OR COLUMN OF CONTACTS, WHEREIN EACH CONTACT CORRESPONDS TO A DIFFERENT SURFACE AREA OF THE PAD AND HAS A FIRST ELECTRICAL CONDUCTOR POSITIONED ON A FIRST LAYER AND A SECOND ELECTRICAL CONDUCTOR POSITIONED OPPOSITE TO THE FIRST CONDUCTOR ON A SECOND LAYER, WITH AT LEAST ONE OF THE FIRST AND SECOND CONDUCTORS BEING OPERABLE TO VARY IN RESISTANCE OR CAPACITANCE BASED ON AN AMOUNT OF PRESSURE APPLIED TO THAT CONDUCTOR, EACH CONTACT BEING CONFIGURED TO ENABLE AN ELECTRICAL CONNECTION BETWEEN THE FIRST AND SECOND CONDUCTORS WITH A RESISTANCE OR CAPACITANCE THAT VARIES BASED ON AN AMOUNT OF PRESSURE APPLIED TO A CORRESPONDING AREA OF THE PAD WHEN AN OBJECT IS POSITIONED ON THAT PAD, WITH THE MATRIX OF CONTACTS BEING OPERABLE TO BE SCANNED TO OBTAIN RESISTANCES OR CAPACITANCES FOR THE ROWS AND COLUMNS OF CONTACTS SO AS TO ENABLE DETECTION OF AN OBJECT PLACED ON OR REMOVED FROM THE PAD

703 — DETERMINE WHETHER AN OBJECT HAS BEEN PLACED ON OR REMOVED FROM THE PAD BASED ON THE SCANNED RESISTANCES OR CAPACITANCES OF THE ROWS AND COLUMNS OF CONTACTS

705 — IN RESPONSE TO DETERMINING THAT AN OBJECT HAS BEEN PLACED ON THE PAD, DETERMINE AT LEAST ONE OF A SIZE, A SHAPE, A LOCATION, A CENTER OF MASS AND A WEIGHT OF THE OBJECT BASED ON THE RESISTANCES OR CAPACITANCES OF AT LEAST ONE ROW AND COLUMN OF CONTACTS

707 — DETERMINE WHETHER AN OBJECT PLACED ON THE PAD IS PROPERLY POSITIONED ON THE PAD BASED ON AT LEAST ONE OF THE SIZE, SHAPE, LOCATION, CENTER OF MASS AND WEIGHT OF THE OBJECT AND A PREDETERMINED OBJECT MAP FOR THAT PAD

FIG. 7

SYSTEMS AND METHODS OF DETECTING, IDENTIFYING AND CLASSIFYING OBJECTS POSITIONED ON A SURFACE

CROSS REFERENCE TO RELATED APPLICATIONS

This application claims the benefit of U.S. Prov. App. No. 62/770,836, filed Nov. 23, 2018, which is hereby incorporated by reference as if fully set forth herein.

FIELD OF DISCLOSURE

The present invention relates generally to detecting, identifying and classifying objects and in particular to detecting, identifying and classifying objects positioned on a surface.

BACKGROUND

In the retail environment, there is a need to autonomously detect, identify and classify retail products placed on a surface (e.g., shelf in an industrial, commercial or retail environment). In particular, such detection, identification, and classification of retail products may address various problems within a retail setting, such as theft, out-of-stock product, misplaced product, and the like. Computer vision systems and artificial intelligence (AI) may utilize information about products and product location on a surface to help resolve these problems. For instance, these systems can facilitate detection and/or prediction of out-of-stock or misplaced merchandise based on analysis of interactions between customers and specific product on a retail shelf. In current applications, products are detected, identified and classified by hand or through the use of video cameras and depth sensors.

Accordingly, there is a need for improved techniques for detecting, identifying and classifying objects positioned on a surface such as on a shelf in a retail environment. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Briefly described, embodiment of the present disclosure relate to systems and methods for performing node deployment. According to one aspect, a sensor pad comprises a plurality of electrical contacts disposed in the pad as a matrix of rows and columns of electrical contacts. Further, each contact corresponds to a different surface area of the pad and has a first electrical conductor positioned on a first layer and a second electrical conductor positioned opposite to the first conductor on a second layer. Also, at least one of the first and second conductors is operable to vary in resistance or capacitance based on an amount of pressure applied to that conductor. Each contact is configured to enable an electrical connection between the first and second conductors with a resistance or capacitance that varies based on an amount of pressure applied to a corresponding area of the pad when an object is positioned on that pad. In addition, the matrix of contacts is operable to be scanned to obtain resistances or capacitances for the rows and columns of contacts so as to enable detection of an object placed on or removed from the pad.

According to another aspect, each electrical conductor is a diode.

According to another aspect, each electrical conductor is a resistor or capacitor.

According to another aspect, each contact is formed with conductive ink.

According to another aspect, the sensor pad further includes a third layer formed by an electrically resistive or capacitive material and positioned between the first layer and the second layer.

According to another aspect, the sensor pad further includes a base layer configured to provide stability to the sensor pad.

According to one aspect, a sensor pad comprises a plurality of electrical contacts disposed in the pad as a matrix of rows and columns of electrical contacts. Further, each contact corresponds to a different surface area of the pad and has a first electrical conductor positioned on a first layer and a second electrical conductor positioned proximate the first conductor on the first layer. Also, at least one of the first and second conductors is operable to vary in resistance or capacitance based on an amount of pressure applied to that conductor. Each contact is configured to enable an electrical connection between the first and second conductors with a resistance or capacitance that varies based on an amount of pressure applied to a corresponding area of the pad when an object is positioned on that pad. In addition, the matrix of contacts is operable to be scanned to obtain resistances or capacitances for the rows and columns of contacts so as to enable detection of an object placed on or removed from the pad.

According to another aspect, the sensor pad further includes a plurality of weight sensors disposed outside the first and second layers and operable to measure a weight of an object placed anywhere on the surface of the pad. Each weight sensor corresponds to a certain surface area of the pad that overlaps a surface area of the pad corresponding to at least one other weight sensor, with each weight sensor being operable to measure an amount of pressure applied to a corresponding surface area of the pad when an object is positioned on the pad. Also, the pressure measurements obtained from the weight sensors may further enable the detection of an object placed on or removed from the surface of the pad.

According to another aspect, the plurality of electrical contacts are composed of conductive ink.

According to another aspect, the sensor pad further includes a base layer configured to provide stability to the sensor pad and a second layer formed by an electrically resistive or capacitive material. Further, the first layer is positioned between the base layer and the second layer.

According to one aspect, a computer-implemented method of detecting an object placed on a sensor pad having a plurality of electrical contacts disposed in the pad as a matrix of rows and columns of electrical contacts comprises, during a scan of the matrix of contacts, receiving, by a processor, from each row and column of contacts, an indication of a resistance or capacitance of that row or column of contacts. Each contact corresponds to a different surface area of the pad and has a first electrical conductor positioned on a first layer and a second electrical conductor positioned opposite to the first conductor on a second layer. Further, at least one of the first and second conductors is operable to vary in resistance or capacitance based on an amount of pressure applied to that conductor. Also, each contact is configured to enable an electrical connection between the first and second conductors with a resistance or capacitance that varies based on an amount of pressure applied to a corresponding area of the pad when an object is positioned on that pad. In addition, the matrix of contacts is operable to be scanned to obtain resistances or capacitances for the rows and columns of contacts so as to enable detection of an object placed on or removed from the pad. The method also includes determining whether an object has been placed on or removed from the pad based on the scanned resistances or capacitances of the rows and columns of contacts.

According to another aspect, the method further comprises, in response to determining that an object has been placed on the pad, determining at least one of a size, a shape, a location, a center of mass and a weight of the object based on the resistances or capacitances of each row and column of the corresponding contacts.

According to another aspect, the method further comprises determining whether an object placed on the pad is properly positioned on the pad.

According to another aspect, the method further comprises determining whether an object has been removed from the pad based on the resistances or capacitances of each row and column of the corresponding contacts.

According to one aspect, a system comprises a processor, a sensor pad and a plurality of analog-to-digital converters (ADCs) operationally coupled between the processor and the sensor pad. The plurality of electrical contacts being disposed in the pad as a matrix of rows and columns. Further, each contact corresponds to a different surface area of the pad and has a first electrical conductor positioned on a first layer and a second electrical conductor positioned opposite to the first conductor on a second layer. Also, at least one of the first and second conductors is operable to vary in resistance or capacitance based on an amount of pressure applied to that conductor. In addition, each contact is configured to enable an electrical connection between the first and second conductors with a resistance or capacitance that varies based on an amount of pressure applied to a corresponding area of the pad when an object is positioned on that pad. The matrix of contacts is operable to be scanned to obtain resistances or capacitances for the rows and columns of contacts so as to enable detection of an object placed on or removed from the pad. Each ADC corresponds to a different row or column of contacts and is operable to obtain an indication of a resistance or capacitance of that row or column of contacts. Finally, the processor is configured to scan the matrix of contacts via the ADCs to determine whether an object has been placed on the pad based on the scanned resistances or capacitances of the rows and columns of electrical contacts.

According to another aspect, each electrical contact is composed of conductive ink.

According to another aspect, the sensor pad further comprises a third layer composed of an electrically resistive or capacitive material and disposed between the first layer and the second layer.

According to another aspect, the sensor pad further comprises a base layer configured to provide stability to the sensor pad.

According to another aspect, the processor is further configured to determine at least one of a size, a shape, a location, a center of mass and a weight of the object based on the resistance or capacitance of at least one row and column of contacts responsive to determining that an object has been placed on the pad.

According to another aspect, the processor is further configured to determine whether an object placed on the pad is properly positioned on the pad based on a predetermined object map for that pad.

According to another aspect, the processor is further configured to determine whether an object has been removed from the pad based on the resistance or capacitance of at least one row and column of contacts.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIG. 7 illustrates another embodiment of a method of detecting, identifying and classifying objects positioned on a surface in accordance with various aspects as described herein.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

Figure 1:
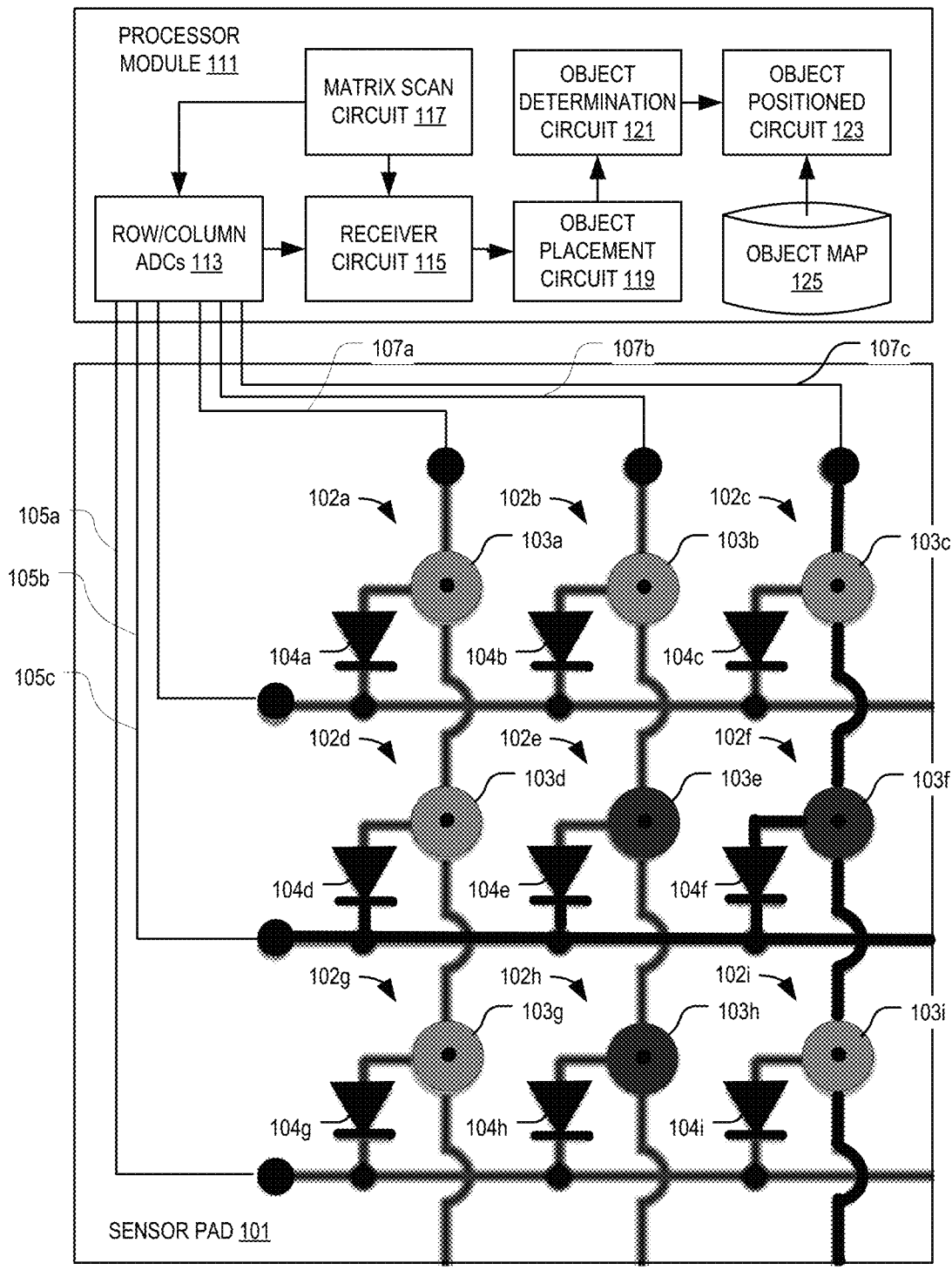
FIG. 1 illustrates one embodiment of a system of detecting, identifying and classifying objects positioned on a surface in accordance with various aspects as described herein.

This disclosure describes systems and methods of detecting, identifying and classifying objects on a surface such as on a shelf in retail are provided. For example, FIG. 1 illustrates one embodiment of a system 100 of detecting, identifying and classifying objects positioned on a surface in accordance with various aspects as described herein. In FIG. 1, the system 100 includes a processor module 110 and a sensor pad 101. The sensor pad 101 includes scanning matrix interconnections having row interconnections 105a-c and column interconnections 107a-c to electrical contacts 102a-i. As shown in FIG. 1, the contacts 102a-d, 102g and 102i are open (i.e., light grey) while the contacts 102e-f and 102h are closed (i.e., dark grey). Each contact 102a-i may include a first electrical conductor 103a-i on a first layer of the sensor pad 101 that is electrically coupled to one of the column interconnections 107a-c, a second electrical conductor proximate and below the first conductor 103a-i on a second layer of the sensor pad 101 and a diode 104a-i electrically coupled between the second conductor and one of the row interconnections 105a-c. In operation, when the first electrical conductor 103a-i receives a force such as from the placement of an object onto a surface area of the pad 101 associated with the contact 102a-i, the first electrical conductor 103a-i is actuated towards and makes contact with the second electrical conductor, resulting in the diode 104a-i having a voltage drop sufficient to enable current flow through that diode. In another embodiment, resistors replace the diodes 104a-i in FIG. 1, with the voltage across the resistor enabling a certain current flow based on the amount of resistance of that resistor. In one example, these resistors are composed of electrically resistive material such as Velastat™, which is composed of polymeric foil (e.g., polyolefins) impregnated with carbon black (e.g., paracrystalline carbon) to make it electrically conductive. As such, the resistance of such electrically resistive material may vary based on the amount of force (e.g., weight) such as from the placement of an object onto a surface area of the pad 101 associated with the corresponding contact. In yet another embodiment, capacitors (e.g., capacitive sensors) replace the diodes 104a-i in FIG. 1, with the capacitance of each capacitor varying based on the amount of force applied to a surface area of the pad 101 associated with the corresponding contact. The capacitance change of each capacitor of the capacitive matrix can be measured to determine the amount of force applied to location(s) on the surface area of the pad 101. Further, the first or second layer may include piezo-capacitive technology.

In FIG. 1, the processor module 111 includes a row/column analog-to-digital converter (ADC) bank, a receiver circuit 115, a matrix scan circuit 117, an object placement circuit 119, an object determination circuit 121, an object positioned circuit 123, an object map 125, the like, or any combination thereof. Each of the row interconnections 105a-c is electrically coupled to a corresponding ADC of the ADC bank 113. Similarly, each of the column interconnections 107a-c is electrically coupled to a corresponding ADC of the ADC bank 113. In operation, during a scan of the matrix of contacts 102a-i controlled by the matrix scan circuit 117, a receiver circuit 115 receives, from each row and column of contacts 102a-i, an indication of a resistance or capacitance of that row or column of contacts 102a-i. The object placement circuit 119 then determines whether an object has been placed or removed on the pad 101. In response to determining that an object has been placed on the pad 101, the object determination circuit 121 determines at least one of a size, shape, location on the pad 101, center of mass, weight, and the like of the object based on the resistances or capacitances of at least one row or column of contacts. The object positioned circuit 123 then determines whether an object placed on the pad 101 is properly positioned on the pad 101 based on a predetermined object map 125 of the pad 101 and the determined size, shape, location, center of mass, weight, or the like of the object. The object map 125 includes the expected placement of certain objects on the pad, with each object being characterized by at least one of the size, shape, location on the pad, a center of mass, weight, and the like.

In another embodiment, the sensor pad 101 includes a plurality of weight sensors disposed between the first and second layers. Each weight sensor corresponds to a different surface area of the pad and is operable to measure an amount of pressure applied to a corresponding surface area of the pad when an object is positioned on the pad. Also, the pressure measurements obtained from the weight sensors further enable the detection of an object placed on or removed from the surface of the pad. In one example, the sensor pad 101 has planar dimensions of ninety centimeters (90 cm) by thirty centimeters (30 cm) with eighteen (18) weight sensors disposed at different locations in the pad 101. In one example, the weight sensors are disposed as a matrix in the pad 101. In another example, the weight sensors are equidistantly disposed as a two-dimensional arrangement in the pad 101.

In another embodiment, one or more pressure measurements obtained from one or more weight sensors enable the determination of the center of mass of an object positioned on the pad.

Figure 2:
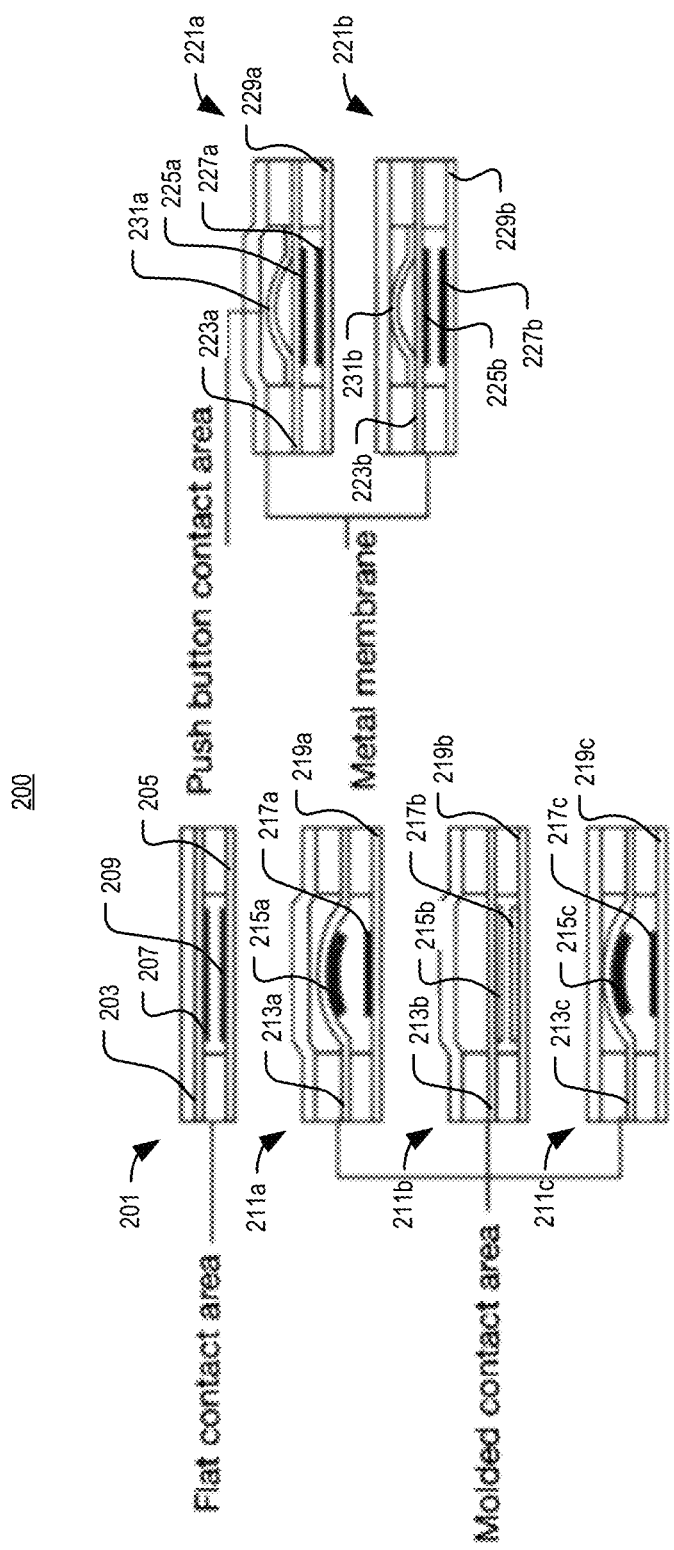
FIG. 2 illustrates various embodiments of contact structures in accordance with various aspects as described herein.

FIG. 2 illustrates various embodiments of contact structures in accordance with various aspects as described herein. In FIG. 2, each contact structure 201, 211a-c, 221a-b includes a first layer 203, 213a-c, 223a-b having a first electrical conductor 207, 217a-c, 227a-b disposed thereon. Further, each contact structure 201, 211a-c, 221a-b includes a second layer 205, 215a-c, 225a-b having a second electrical conductor 209, 219a-c, 229a-b disposed opposite to the first conductor 207, 217a-c, 227a-b and on the second layer 205, 215a-c, 225a-b. The contact structure 201 includes a contact area disposed between the first and second conductors 207, 209 having a flat surface. In comparison, the contact structures 211a,c have a molded contact area formed by the first layer 213a,c having a curved surface and a similarly curved first conductor 215a,c disposed thereon. Similarly, the contact structure 211b has a molded contact area formed by a top layer of the structure 211b having a curved surface. Alternatively, each contact structure 221a-b includes a metal membrane disposed between a top layer and the first layer of the structure 211a-b. Further, each contact structure 221a-b includes a contact area disposed between the first and second conductors 225a-b, 227a-b having a flat surface. The contact structure 221a has a top layer with a curved surface while the contact structure 221b has a top layer with a flat surface.

Figure 3:
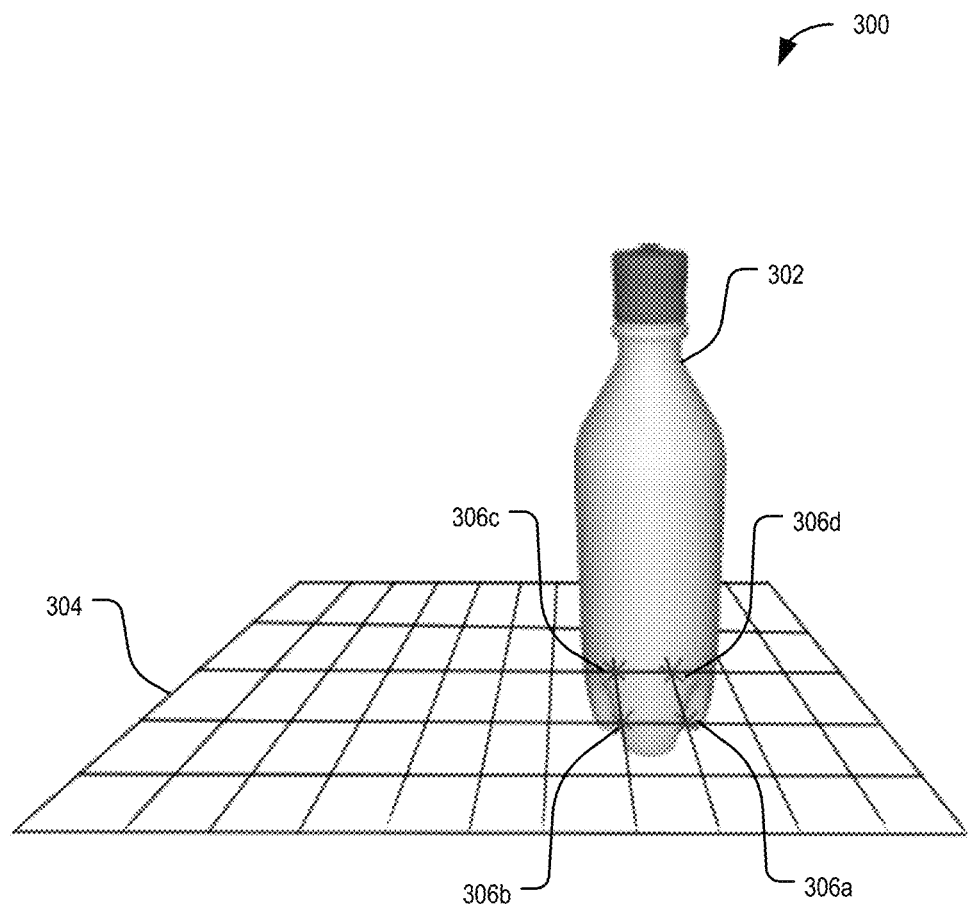
FIG. 3 illustrates a use case of one embodiment of a system of detecting, identifying and classifying objects positioned on a surface in accordance with various aspects as described herein.

FIG. 3 illustrates a use case of one embodiment of a scanning matrix 304 in accordance with various aspects described herein. In FIG. 3, an object 302 is placed on the sensor pad 304. In one example, the weight of the object 302 applies pressure to contacts 306a-d, which in response, closes each contact 306a-d, resulting in an electrical connection. In this example, a processor via an ADC bank scans the rows and columns of the contact matrix to determine that contacts 306a-d are closed while the other contacts remain open. In another example, the weight of the object 302 applies pressure to contacts 306a-d, which in response, changes a capacitance of each contact 306a-d. In this example, a processor via an ADC bank scans the rows and columns of the contact matrix to determine the capacitance of each contact 306a-d. Further, the processor may determine at least one of a size, a shape, a center of mass, a weight, and a location of the object 302 based on signals received from the contact matrix via the ADC bank. This contact matrix may be represented by a matrix or array of points, with each point associated with a corresponding surface area of the sensor pad 304. Further, each point may represent a certain amount of pressure applied to the corresponding surface area. The processor may determine at least one of a size, a shape, a center of mass, a weight, and a location of the object 302 based on this array of points.

Figure 4A:
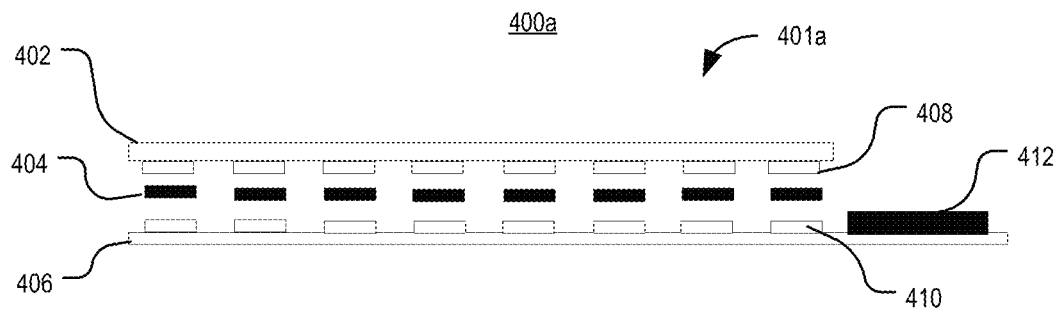
FIGS. 4A-B illustrate other embodiments of a system of detecting, identifying and classifying objects positioned on a surface in accordance with various aspects as described herein.
Figure 4B:
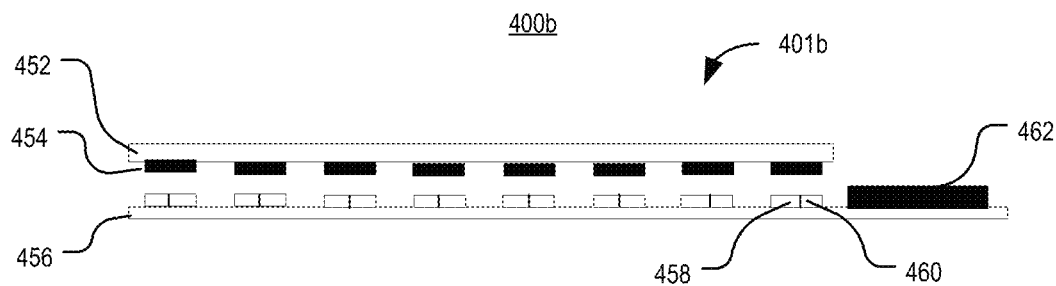

FIGS. 4A-B illustrate other embodiments of a system of detecting, identifying and classifying objects positioned on a surface in accordance with various aspects as described herein. In FIG. 4A, the system 400a includes a microcontroller 412 and a sensor pad 401a having a film layer 402, a electrically resistive or capacitive material layer 404, a base layer 406, a matrix of contacts having a first matrix of conductors 408 and a second matrix of conductors 410. The matrix of contacts having rows and columns of contacts and as such, the first and second matrices of conductors 408, 410 having rows and columns of those conductors.

In one example, the first matrix of conductors 408 may be disposed on the film layer 402. The first matrix of conductors 408 may be composed of electronic ink and which may be printed on the film layer 402. Further, the second matrix of conductors 410 may be disposed on the base layer 406. The second matrix of conductors 410 may be composed of electronic ink which may be printed on the base layer 410. Further, the microcontroller 412 may be positioned on the base layer 406 and electrically coupled to the matrix of contacts via an ADC bank integrated with the microcontroller 412.

As illustrated in FIG. 4A, the first matrix of conductors 408 and the second matrix of conductors 410 may be positioned opposite each other such that a conductor from the first matrix and a conductor from the second matrix form an opposing pair of conductors. Furthermore, the layer of electrically resistive or capacitive material 404 may be disposed between the first and second matrices of conductors. In one example, the layer of electrically resistive material 404 may be Velastat™.

In FIG. 4B, the system 400b includes a microcontroller 462 having a row/column ADC bank and a sensor pad 401b having a film layer 452, an electrically resistive or capacitive material layer 454, a base layer 456, a first matrix of conductors 458, and a second matrix of conductors 460. In one example, the layer of electrically resistive or capacitive material 454 may be disposed on or otherwise integrated with the layer of film 452. The layer of electrically resistive or capacitive material 404 may be Velastat™. Further, the first and second matrices of conductors 458, 460 may be attached or otherwise integrated with the base layer 456. The first and second matrices of conductors 458, 460 may be composed of electronic ink and may be printed on the base layer 456. The microcontroller 462 may be positioned on the base layer 456. In addition, the first and second matrices of conductors 458, 460 may be positioned on the base layer 456 such that a conductor from the first matrix and a conductor from the second matrix represent an adjacent pair of conductors.

Figure 5:
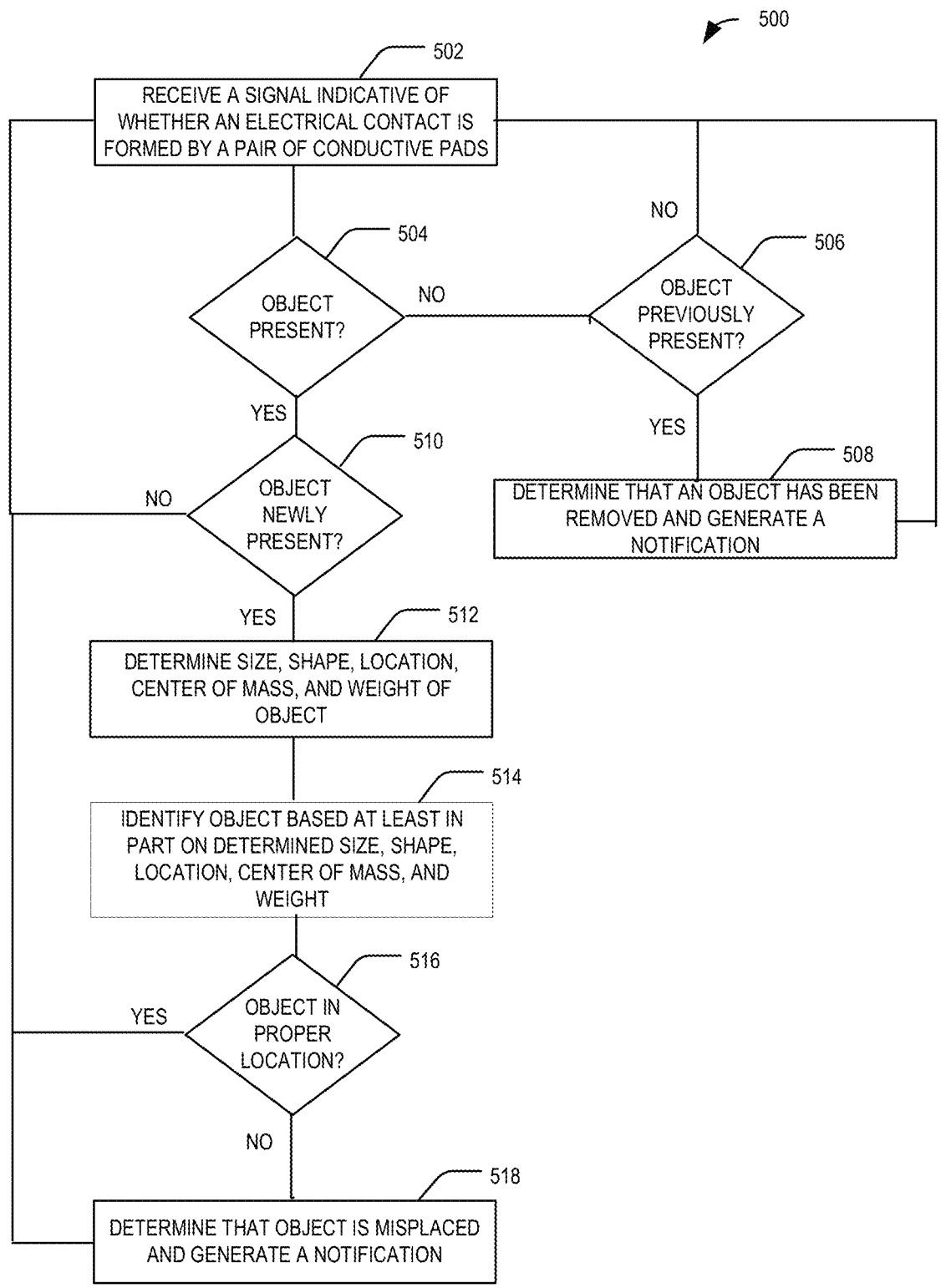
FIG. 5 illustrates one embodiment of a method of detecting, identifying and classifying objects positioned on a surface in accordance with various aspects as described herein.

FIG. 5 illustrates one embodiment of a method 500 of detecting, identifying and classifying objects positioned on a surface in accordance with various aspects as described herein. In various examples, the method 500 may be performed by any of the processors described herein. Although the steps of method 500 are presented in a particular order, this is only for simplicity. The steps of method 500 may be performed in a different order and/or not every step may be performed.

In step 502, a signal indicative of whether an electrical contact is formed by a pair of conductive pads is generated. For example, when an object is placed on a sensing pad, such as the object detection and classification system 400 of FIG. 4A or the object detection and classification system 450 of FIG. 4B, pressure from the object may cause an electrical contact to be formed between one or more pairs of conductive pads. In this example, each pair of conductive pads that have formed an electrical contact may generate a signal indicating that the contact has been made. At the same time, each pair of conductive pads that have not formed an electrical contact may generate a signal indicating that a contact has not been made.

In determination step 504, a determination of whether an object is present may be made. For example, if one or more signals indicating that one or more contacts have been formed are received, then a determination that an object is present may be made based on the received signals. If an object is determined to not be present (i.e., determination step 504="No"), then the method may proceed to determination step 506.

In determination step 506, a determination of whether an object was previously present is made. For example, an individual may pick up or otherwise remove an object from a shelf in which a sensing pad is utilized. Prior to the object being removed, corresponding pairs of conductive pads may have been generating signals indicating that the object was present (e.g., electrical contact between pairs). Once the object is removed, the corresponding pairs of conductive pads will then generate signals indicating that an object is not present (e.g., no electrical contact between pairs). Thus, in determination step 506, a comparison of previously received signals and presently received signals may be made. If an object is determined to have been previously present (i.e., determination step 508="Yes"), then the method may proceed to step 508. Otherwise, the method may return to step 502.

In step 508, a determination that an object has been removed may be made and a notification of removal may be generated. In various examples, the removal notification may include an identification of the removed object. Such identification may be based on a prior detection of the object. The removal notification may also include, for example, information regarding timing of the object removal (e.g., date and time the object was removed) as well as other information about the object (e.g., a size of the object, a center of mass of the object, a weight of the object, a shape of the object, a location from which the object was removed, etc.). After step 508, the method may return to step 502.

Returning to determination step 504, if an object is determined to be present (i.e., determination step 504="Yes"), then the method may proceed to determination step 510.

In determination step 510, a determination of whether the object is newly present may be made. For example, an object may be newly stocked on a shelf or placed back on a shelf (in either a proper location or a wrong location). Prior to the object being placed on the shelf, corresponding pairs of conductive pads may have been generating signals indicating that no object was present (e.g., no electrical contact between pairs). Once an object is placed on the shelf, corresponding pairs of conductive pads may generate signals indicating that an object is present (e.g., electrical contact between pairs). Thus, in determination step 510, a comparison of previously received signals and presently received signals may be made. If an object is determined to be newly present (i.e., determination step 510="Yes"), then the method 500 may proceed to step 512. Otherwise, the method 500 may return to step 502.

In step 512, a size, a shape, a location, a center of mass, and a weight of the object may be determined. In various examples, a sensing pad (e.g., object detection and classification system 400 or object detection and classification system 450) may have a fixed size. In addition, each conductive pad within a matrix may be uniquely identifiable and a position of each conductive pad relative to the matrix may be identified. Thus, when an object is placed in one corner of the sensing pad and electrical contacts are formed by corresponding pairs of conductive pads, for example, it may be determined that the object was placed in the corner because the location of the corresponding conductive pairs is already known. Similarly, a size and a shape of the object may be determined based on a number of electrical contacts formed by pairs of conductive pads as well as the relationship of those pairs of conductive pads to each other and other pairs of conductive pads not forming electrical contacts.

In step 514, an identification may be estimated or otherwise made based at least in part on the determined size, shape, location, center of mass, and weight of the object. In various examples, a proper location for an object (e.g., top shelf in first aisle) may be previously determined. Furthermore, a given size, a given shape, a given center of mass, and a given weight of an object may be previously determined. In some examples, such previously determined information may be maintained in a planogram or other collection of information (e.g., a database, a data store, a file, etc.). Thus, an identification of a detected object may be estimated or otherwise made by comparing the information determined in step 512 with the previously determined information from the planogram or other collection of information.

In determination step 516, a determination of whether of an object is in a proper location may be made. For example, if an identification of the object may be estimated in step 514, then a determination that the object is in a proper location may be made in determination step 516. Otherwise, if an identification of the object may not be estimated or otherwise made in step 514 or an identifiable object is known to be misplaced, then a determination that the object is not in a proper location may be made in determination step 516.

If a determination that the object is in a proper location is made (i.e., determination step 516="Yes"), then the method 500 may return to step 502.

If a determination that the object is not in a proper location is made (i.e., determination step 516="No"), then the method 500 may proceed to step 518.

In step 518, a determination that the object is misplaced may be made and a notification regarding the misplaced object may be generated. In various examples, the misplaced object notification may include information about the misplaced object. The included information may include, for example, a determined size, shape, location, center of mass, and weight of the misplaced object. The included information may also include, for example, an identification of the misplaced object. After the misplaced object notification is generated, the method 500 may return to step 502.

Figure 6:
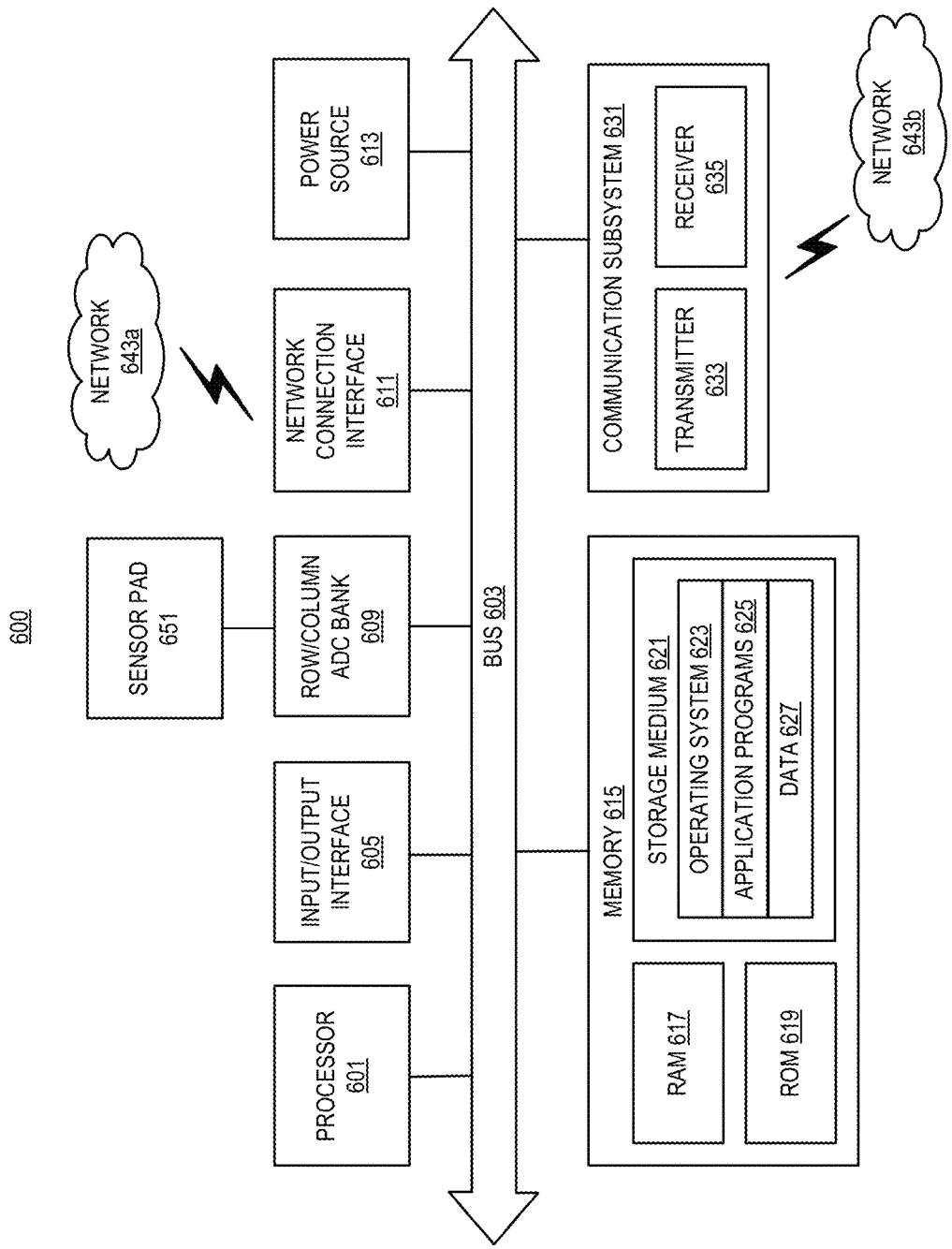
FIG. 6 illustrates one embodiment of a system of detecting, identifying and classifying objects positioned on a surface in accordance with various aspects as described herein.

FIG. 6 illustrates one embodiment of a system 600 of detecting, identifying and classifying objects positioned on a surface in accordance with various aspects as described herein. In FIG. 6, the system 600 includes processing circuitry 601 that is operatively coupled to input/output interface 605, a row/column ADC bank 609, network connection interface 611, memory 615 including random access memory (RAM) 617, read-only memory (ROM) 619, and storage medium 621 or the like, communication subsystem 631, power source 633, and/or any other component, or any combination thereof. Storage medium 621 includes operating system 623, application program 625, and data 627. In other embodiments, storage medium 621 may include other similar types of information. Certain systems may utilize all of the components shown in FIG. 6, or only a subset of the components. The level of integration between the components may vary from one system to another system. Further, certain systems may contain multiple instances of a component, such as multiple processors, memories, neural networks, network connection interfaces, transceivers, etc.

In FIG. 6, processing circuitry 601 may be configured to process computer instructions and data. Processing circuitry 601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 601 may include two central processing units (CPUs). Data may be information in a form suitable for use by a computer.

In the depicted embodiment, input/output interface 605 may be configured to provide a communication interface to an input device, output device, or input and output device. The system 600 may be configured to use an output device via input/output interface 605. An output device may use the same type of interface port as an input device. For example, a USB port may be used to provide input to and output from the system 600. The output device may be a speaker, a sound card, a video card, a display, a monitor, a printer, an actuator, an emitter, a smartcard, another output device, or any combination thereof. The system 600 may be configured to use an input device via input/output interface 605 to allow a user to capture information into the system 600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, an infrared sensor, a proximity sensor, another like sensor, or any combination thereof. For example, the input device may be an optical sensor and an infrared sensor.

In FIG. 6, the row/column ADC bank 609 may be configured to scan a matrix of contacts of the sensor pad 651. The network connection interface 611 may be configured to provide a communication interface to network 643a. The network 643a may encompass wired and/or wireless networks such as a local-area network (LAN), a wide-area network (WAN), a computer network, a wireless network, a telecommunications network, another like network or any combination thereof. For example, network 643a may comprise a Wi-Fi network. The network connection interface 611 may be configured to include a receiver and a transmitter interface used to communicate with one or more other devices over a communication network according to one or more communication protocols, such as Ethernet, TCP/IP, SONET, ATM, or the like. The network connection interface 611 may implement receiver and transmitter functionality appropriate to the communication network links (e.g., optical, electrical, and the like). The transmitter and receiver functions may share circuit components, software or firmware, or alternatively may be implemented separately.

The RAM 617 may be configured to interface via a bus 603 to the processing circuitry 601 to provide storage or caching of data or computer instructions during the execution of software programs such as the operating system, application programs, and device drivers. The ROM 619 may be configured to provide computer instructions or data to processing circuitry 601. For example, the ROM 619 may be configured to store invariant low-level system code or data for basic system functions such as basic input and output (I/O), startup, or reception of keystrokes from a keyboard that are stored in a non-volatile memory. The storage medium 621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 621 may be configured to include an operating system 623, an application program 625 such as a produce item selection program, a widget or gadget engine or another application, and a data file 627. The storage medium 621 may store, for use by the system 600, any of a variety of various operating systems or combinations of operating systems.

The storage medium 621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 621 may allow the system 600 to access computer-executable instructions, application programs or the like, stored on transitory or non-transitory memory media, to off-load data, or to upload data. An article of manufacture, such as one utilizing a communication system may be tangibly embodied in the storage medium 621, which may comprise a device readable medium.

In FIG. 6, the processing circuitry 601 may be configured to communicate with network 643b using the communication subsystem 631. The network 643a and the network 643b may be the same network or networks or different network or networks. The communication subsystem 631 may be configured to include one or more transceivers used to communicate with the network 643b. For example, the communication subsystem 631 may be configured to include one or more transceivers used to communicate with one or more remote transceivers of another system capable of wireless communication according to one or more communication protocols, such as IEEE 802.11, CDMA, WCDMA, GSM, LTE, UTRAN, WiMax, or the like. Each transceiver may include transmitter 633 and/or receiver 635 to implement transmitter or receiver functionality, respectively, appropriate to the RAN links (e.g., frequency allocations and the like). Further, transmitter 633 and receiver 635 of each transceiver may share circuit components, software or firmware, or alternatively may be implemented separately.

In the illustrated embodiment, the communication functions of the communication subsystem 631 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 631 may include cellular communication, Wi-Fi communication, Bluetooth communication, and GPS communication. Further, the communication subsystem 631 may include functions to determine the presence or proximity of a wireless device to the system 600 or any of its components such as the sensor pad 651. For example, the communication subsystem 631 may include a Bluetooth transceiver that is operable to determine the presence or proximity of a wireless device to the sensor pad 651, with the wireless device also having a Bluetooth transceiver. A skilled artisan will readily recognize various algorithms for determining the presence or proximity of a wireless device. In addition, the system 600 via the Bluetooth transceiver of the communication subsystem 631 may obtain various information from each detected Bluetooth device such as a device name, a Bluetooth address, a device type, a first detection time, a last detection time, or the like. A wireless device may be referred to as a user equipment (UE), a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or some other like terminology. The network 643b may encompass wired and/or wireless networks such as a local-area network (LAN), a wide-area network (WAN), a computer network, a wireless network, a telecommunications network, another like network or any combination thereof. For example, the network 643b may be a cellular network, a Wi-Fi network, and/or a near-field network. The power source 613 may be configured to provide alternating current (AC) or direct current (DC) power to components of the system 600.

The features, benefits and/or functions described herein may be implemented in one of the components of the system 600 or partitioned across multiple components of the system 600. Further, the features, benefits, and/or functions described herein may be implemented in any combination of hardware, software or firmware. In one example, communication subsystem 631 may be configured to include any of the components described herein. Further, the processing circuitry 601 may be configured to communicate with any of such components over the bus 603. In another example, any of such components may be represented by program instructions stored in memory that when executed by the processing circuitry 601 perform the corresponding functions described herein. In another example, the functionality of any of such components may be partitioned between the processing circuitry 601 and the communication subsystem 631. In another example, the non-computationally intensive functions of any of such components may be implemented in software or firmware and the computationally intensive functions may be implemented in hardware.

FIG. 7 illustrates another embodiment of a method 700 of detecting, identifying and classifying objects positioned on a surface in accordance with various aspects as described herein. In FIG. 7, the method 700 starts, for instance, at block 701 where it includes, during a scan of a matrix of contacts having rows and columns of contacts, receiving, by a processor, from each row and column of contacts, an indication of a resistance or capacitance of that row or column of contacts. Further, each contact corresponds to a different surface area of the pad and has a first electrical conductor positioned on a first layer and a second electrical conductor positioned opposite to the first conductor on a second layer. Also, at least one of the first and second conductors is operable to vary in resistance or capacitance based on an amount of pressure applied to that conductor. Each contact is configured to enable an electrical connection between the first and second conductors with a resistance or capacitance that varies based on an amount of pressure applied to a corresponding area of the pad when an object is positioned on that pad. In addition, the matrix of contacts is operable to be scanned to obtain resistances or capacitances for the rows and columns of contacts so as to enable detection of an object placed on or removed from the pad.

In FIG. 7, the method 700 may include determining whether an object has been placed on or removed from the pad based on the scanned resistances or capacitances of the rows and columns of contacts, as represented by block 703. At block 705, the method 700 may include determining at least one of a size, a shape, a location, a center of mass and a weight of the object based on the resistances or capacitances of at least one row and column of contacts responsive to determining that an object has been placed on the pad. At block 707, the method 700 may include determining whether an object placed on the pad is properly positioned on the pad based on at least one of the size, shape, location, center of mass and weight of the object and a predetermined object map for that pad. This predetermined object map represents the expected placement of certain objects on the pad, with each object being characterized by at least one of the size, shape, location on the pad, center of mass, weight, and the like.

In another embodiment, the method may include determining how many objects having a same weight are in a container (e.g., a box of the same candy bars) positioned on a sensor pad, removed from that container or placed in that container based on at least one of the size, shape, location on the pad, center of mass, weight, and the like.

In another embodiment, the method may include determining how many objects having a same weight are in a container positioned on a sensor pad, removed from that container or placed in that container based on measured resistances or capacitances for the rows and columns of a contact matrix of the pad or one or more pressure measurements obtained from one or more weight sensors disposed in the pad.

In another embodiment, the method may include determining how many objects having a same weight are in a container positioned on a sensor pad, removed from that container or placed in that container based on a predetermined object map that represents at least one of an expected placement of the container on the pad, a weight of the container when full of the objects having the same weight, a weight of the container when empty, a weight of each object having the same weight, and the like.

In another embodiment, the method may include determining whether an object placed into a container positioned on a sensor pad and having objects of the same weight is one of those objects having the same weight based on at least one of the size, shape, location on the pad, center of mass, weight, and the like.

In another embodiment, the method may include determining whether an object placed in a container positioned on a sensor pad and having objects of the same weight is one of those objects having the same weight based on measured resistances or capacitances for the rows and columns of a contact matrix of the pad or one or more pressure measurements obtained from one or more weight sensors disposed in the pad.

In another embodiment, the method may include determining whether an object placed in a container positioned on a sensor pad and having objects of the same weight is one of those objects having the same weight based on a predetermined object map that represents at least one of an expected placement of the container on the pad, a weight of the container when full of the objects having the same weight, a weight of the container when empty, a weight of each object having the same weight, and the like.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

In one embodiment, a system for detecting, identifying and classifying objects on a pad surface may include a scanning matrix of sensitive elements and a computing unit (e.g., microcontroller). Each sensor element of the matrix may include, for example, a diode and a contact group connected in series with it. A contact group may include, for example, two contacts with each contact located on an elastic surface. In one example, two elastic surfaces are utilized with each contact located on one of the elastic surfaces opposite the other contact located on the other elastic surface. Further in this example, an air or liquid dielectric may be used between the two elastic surfaces. Alternatively, or in addition, both contacts may be located next to each other on a single elastic surface. When mechanical pressure is applied to one surface, the two contacts may be brought together to form an electrical contact.

In another embodiment, a scanning matrix may be formed from a multilayer film structure. At least two layers of the multilayer film structure may have conductors. When an electrical contact is formed between a pair of contacts, a signal may be generated and sent to a computing unit. Based on signals received from various contact pairs within the scanning matrix, the computing unit may be able to calculate a localization of closed contacts. Based on the calculated localization information, a size, a shape, a center of mass, a weight, and a location of an object placed on the scanning matrix may be approximated or otherwise determined. The determined size, shape, center of mass, weight, and location of the object may be utilized to classify or otherwise identify the object placed on the scanning matrix.

The detection system may include communication protocols, which allows them to be included in various topological schemes. This provides coverage of surfaces of different areas of sensitive elements, while working as a single unit.

In one embodiment, a multi-dimensional detection of the presence and weight of the goods placed on or removed from a sensor pad is provided. Many of the existing approaches position sensors at predetermined locations in the pad so that they are directly below each retail item. As such, this approach localizes each sensor to specific surface areas of the pad that are expected to have retail items placed thereon so that each retail item or group of retail items corresponds to a sensor that weighs the retail item or detects its presence. In this embodiment, the detection of the placement of retail items on the pad and the determination of the characteristics of such items so as to identify and classify those items have no dimensional restrictions and can be implemented for retail items having any size, weight, shape, location, contour, proportion, or like characteristic while maintaining the necessary functionality to determine these characteristics. However, to achieve this implementation, the pad must be made of a sufficiently elastic material that allows these characteristics to be maintained when a retail item is placed on the pad.

In another embodiment, two or more characteristics of retail items are used to determine whether a retail item is placed on or removed from the pad. These characteristics are weight, center of mass and point locations of the retail object placed on the pad.

In another embodiment, different combinations of weight, center of mass and point locations of the retail object placed on the pad are used to determine the placement/removal of retail items on/from the pad.

In another embodiment, the determination of the presence of certain retail items such as a bottle, box or can requires the use of point locations of the retail object placed on the pad. However, the additional determination of the weight of this product in this embodiment provides advantages for the subsequent re-determination of when this retail item is fenced for a video camera (e.g., the retail item is placed in a back row of the pad). In this case, the weight of the retail item and its contour may be sufficient to identify the goods.

In another embodiment, the center of mass is determined at the time a retail item is placed on or removed from the pad based on weight measurements of the weight sensors that are on a single pad plane and that correspond to the surface area of the pad that the retail item is place on or removed from that pad.

In another embodiment the weight of a group of retail items may be used to determine whether one of the retail items of the group has been removed from or returned to the group while the group is positioned on the pad. For instance, for a box having a plurality of chocolates positioned on the pad, the removal or return of one chocolate does not change the point locations of the box placed on the pad. However, each removal or return of a chocolate changes the center of mass of the box in such a way that it indicates from where that chocolate was removed or returned.

Figure 8:
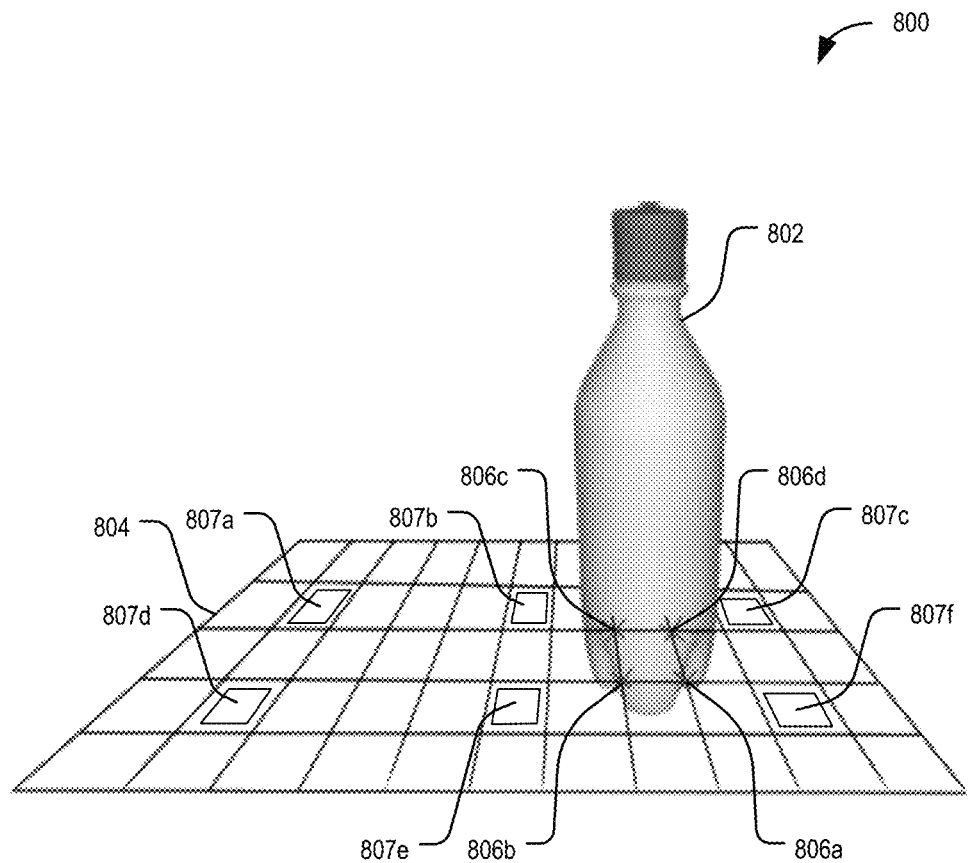
FIG. 8 illustrates a use case of another embodiment of a system of detecting, identifying and classifying objects positioned on a surface in accordance with various aspects as described herein.

FIG. 8 illustrates a use case of another embodiment of a system 800 of detecting, identifying and classifying objects positioned on a surface in accordance with various aspects as described herein. In FIG. 8, an object 802 is placed on the sensor pad 804 having contacts 806a-d and weight sensors 807a-f. In one example, the weight of the object 802 applies pressure to the contacts 806a-d and the weight sensors 807b,c,e,f. In response, a processor may determine at least one of a size, a shape, a center of mass, a weight, and a location of the object 802 based on any combination of signals received from the contacts 806a-d and the weight sensors 807b,c,e,f. In one example, the weight of the object 802 is determined based on the weight sensors 807b,c,e,f. In another example, the center of mass of the object 802 is determined based on the weight sensors 807b,c,e,f. In yet another example, the shape of the object 802 is determined by the contacts 806a-d. In still yet another example, the location of the object 802 is determined by the contacts 806a-d.

Figure 9:
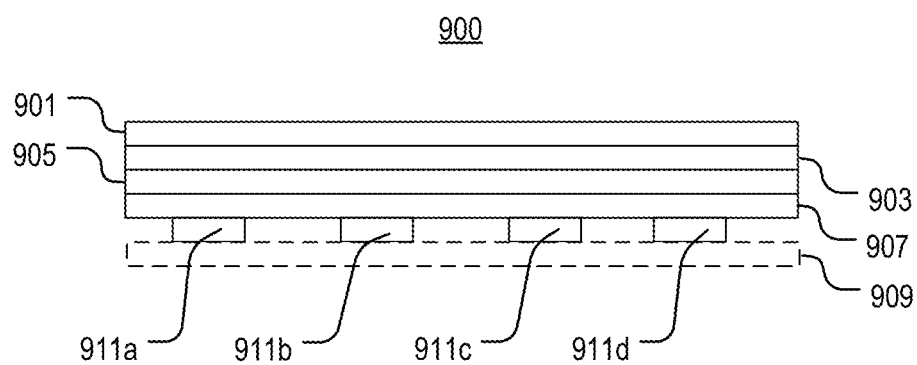
FIG. 9 illustrates another embodiment of a system of detecting, identifying and classifying objects positioned on a surface in accordance with various aspects as described herein.

FIG. 9 illustrates another embodiment of a sensor pad 900 in accordance with various aspects as described herein. In FIG. 9, the sensor pad 900 is configured to have a first layer 901 with a first matrix of conductors (e.g., conductive layer), a second layer 903 (e.g., insulator such as air), a third layer 905 with a second matrix of conductors (e.g., conductive layer), a fourth layer 907 (e.g., rigid foundation layer), a plurality of weight sensors 911a-d disposed on the bottom of the fourth layer 907, a fifth layer 909 (e.g., protective layer), the like, or any combination thereof. The first, second and third layers 901, 903, 905 include a matrix of contacts and may represent any of the sensor pad structures described herein such as by FIGS. 4A-B. The fourth layer 907 is configured to be structurally rigid so that at least two weight sensors 911a-d are operable to measure a weight of an object placed on a certain surface area of the pad 900. In one example, the fourth layer 907 is configured to be structurally rigid so that at least four weight sensors 911a-d are operable to measure the weight of an object placed towards the center of the surface area of the pad. In another example, the fourth layer 907 is configured to be structurally rigid so that at least two weight sensors 911a-d are operable to measure the weight of an object placed towards the perimeter of the surface area of the pad. The fifth layer 909 is an optional layer that is configured to protect the weight sensors 911a-d from any normal or excessive wear and tear.

In another embodiment, the surface area of a sensor pad that corresponds to a non-negligible measurement by a weight sensor is greater than the surface area of the pad that corresponds to a non-negligible measurement by a contact.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A sensor pad configured to be coupled to a processor, with the processor being operable to detect an object placed on the sensor pad, comprising:
    a plurality of electrical contacts disposed in the pad as a matrix of rows and columns of electrical contacts, with each contact corresponding to a different surface area of the pad and having a first electrical conductor positioned on a first layer and a second electrical conductor positioned opposite to the first conductor on a second layer, with at least one of the first and second conductors being operable to vary in resistance or capacitance based on an amount of pressure applied to that conductor, each contact being configured to enable an electrical connection between the first and second conductors with a resistance or capacitance that varies based on an amount of pressure applied to a corresponding surface area of the pad when an object is positioned on that pad, with the matrix of contacts being operable to be scanned by the processor to obtain resistances or capacitances for the rows and columns of contacts so as to enable detection of an object placed on or removed from the surface of the pad; and
    a plurality of weight sensors disposed outside the first and second layers and operable to measure a weight of an object placed anywhere on the surface of the pad, each weight sensor corresponding to a certain surface area of the pad that overlaps a surface area of the pad corresponding to at least one other weight sensor, with each weight sensor being operable to measure an amount of pressure applied to a corresponding surface area of the pad when an object is positioned on the pad, with the pressure measurements obtained from the weight sensors further enabling the detection of an object placed on or removed from the surface of the pad.

2. The sensor pad of claim 1, wherein each electrical conductor includes a resistor or capacitor.

3. The sensor pad of claim 1, wherein each contact is composed of conductive ink.

4. The sensor pad of claim 1, further comprising a third layer composed of an electrically resistive or capacitive material and disposed between the first layer and the second layer.

5. The sensor pad of claim 1, further comprising a base layer configured to provide stability to the sensor pad.

6. A sensor pad configured to be coupled to a processor, with the processor being operable to detect an object placed on the sensor pad, comprising:

a plurality of electrical contacts disposed in the pad as a matrix of rows and columns of electrical contacts, with each contact corresponding to a different surface area of the pad and having a first electrical conductor positioned on a first layer and a second electrical conductor positioned proximate the first conductor on the first layer, with at least one of the first and second conductors being operable to vary in resistance or capacitance based on an amount of pressure applied to that conductor, each contact being configured to enable an electrical connection between the first and second conductors with a resistance or capacitance that varies based on an amount of pressure applied to a corresponding area of the pad when an object is positioned on that pad, with the matrix of contacts being operable to be scanned by the processor to obtain resistances or capacitances for the rows and columns of contacts so as to enable detection of an object placed on or removed from the pad; and a plurality of weight sensors disposed outside the first and second layers, each weight sensor corresponding to a different surface area of the pad and being operable to measure an amount of pressure applied to a corresponding surface area of the pad when an object is positioned on the pad, with the pressure measurements obtained from the weight sensors further enabling the detection of an object placed on or removed from the surface of the pad.

7. The sensor pad of claim 6, further comprising a base layer configured to provide stability to the sensor pad and a second layer composed of an electrically resistive or capacitive material, wherein the first layer is disposed between the base layer and the second layer.

8. A computer-implemented method performed by a processor of detecting an object placed on a sensor pad having a plurality of electrical contacts disposed in the pad as a matrix of rows and columns of electrical contacts, comprising:

during a scan of the matrix of contacts having rows and columns of contacts, receiving, by the processor, from each row and column of contacts, an indication of a resistance or capacitance of that row or column of contacts, wherein each contact corresponds to a different surface area of the pad and has a first electrical conductor positioned on a first layer and a second electrical conductor positioned opposite to the first conductor on a second layer, with at least one of the first and second conductors being operable to vary in resistance or capacitance based on an amount of pressure applied to that conductor, each contact being configured to enable an electrical connection between the first and second conductors with a resistance or capacitance that varies based on an amount of pressure applied to a corresponding area of the pad when an object is positioned on that pad, with the matrix of contacts being operable to be scanned to obtain resistances or capacitances for the rows and columns of contacts;

obtaining a pressure measurement from at least one of a plurality of weight sensors disposed outside the first and second layers, each weight sensor corresponding to a different surface area of the pad and being operable to measure an amount of pressure applied to a corresponding surface area of the pad when an object is positioned on the pad; and determining whether an object has been placed on or removed from the pad based on the scanned resistances or capacitances of the rows and columns of contacts and the obtained pressure measurement.

9. The method of claim 8, further comprising:

in response to determining that an object has been placed on the pad, determining at least one of a size, a shape, a location, a center of mass and a weight of the object based on the resistance or capacitance of at least one row and column of contacts and the obtained pressure measurement.

10. The method of claim 9, further comprising:

determining whether an object placed on the pad is properly positioned on the pad based on at least one of a size, a shape, a location, a center of mass and a weight of the object and a predetermined object map for that pad.

11. The method of claim 8, further comprising:

determining whether an object has been removed from the pad based on the resistance or capacitance of one or more rows and columns of contacts and the obtained pressure measurement.

12. A system, comprising:

a processor;

a sensor pad, comprising:

a plurality of electrical contacts disposed in the pad as a matrix of rows and columns, with each contact corresponding to a different surface area of the pad and having a first electrical conductor positioned on a first layer and a second electrical conductor positioned opposite to the first conductor on a second layer, with at least one of the first and second conductors being operable to vary in resistance or capacitance based on an amount of pressure applied to that conductor, each contact being configured to enable an electrical connection between the first and second conductors with a resistance or capacitance that varies based on an amount of pressure applied to a corresponding area of the pad when an object is positioned on that pad, with the matrix of contacts being operable to be scanned to obtain resistances or capacitances for the rows and columns of contacts; and a plurality of weight sensors disposed outside the first and second layers, each weight sensor corresponding to a different surface area of the pad and being operable to measure an amount of pressure applied to a corresponding surface area of the pad when an object is positioned on the pad;

a plurality of analog-to-digital converters (ADCs) operationally coupled to the processor, with each ADC corresponding to a different row or column of contacts and operable to obtain an indication of a resistance or capacitance of that row or column of contacts; and wherein the processor is configured to:

scan the matrix of contacts via the ADCs to obtain the resistances or capacitances for the rows and columns of contacts;

obtain a pressure measurement from one or more weight sensors, and determine whether an object has been placed on the pad based on the scanned resistances or capacitances of the rows and columns of electrical contacts and the obtained pressure measurement.

13. The system of claim 12, wherein the sensor pad further comprises a third layer composed of an electrically resistive or capacitive material and disposed between the first layer and the second layer.

14. The system of claim 12, wherein the sensor pad further comprises a base layer configured to provide stability to the sensor pad.

15. The system of claim 12, wherein the processor is further configured to:
   determine at least one of a size, a shape, a location, a center of mass and a weight of the object positioned on the pad based on the resistances or capacitances of at least one row and column of contacts and the obtained pressure measurement responsive to determining that an object has been positioned on the pad.

16. The system of claim 12, wherein the processor is further configured to determine whether an object placed on the pad is properly positioned on the pad based on a predetermined object map for that pad.

17. The system of claim 12, wherein the processor is further configured to determine whether an object has been removed from the pad based on the resistances or capacitances of at least one row and column of contacts and the obtained pressure measurement.

* * * * *